United States Patent [19]

Ruby

[11] Patent Number: 4,557,417
[45] Date of Patent: Dec. 10, 1985

[54] HEAT CONTROL

[76] Inventor: Ernest D. Ruby, 839 Laramie St., Glenview, Ill. 60025

[21] Appl. No.: 675,290

[22] Filed: Nov. 27, 1984

[51] Int. Cl.$^4$ ............................................. G05D 23/00
[52] U.S. Cl. .................................. 236/46 R; 236/91 F
[58] Field of Search ............... 236/46, 47, 91 F, 91 R, 236/91 G

[56] References Cited

U.S. PATENT DOCUMENTS

| | | | |
|---|---|---|---|
| 4,102,495 | 7/1978 | Flynn et al. | 236/46 R |
| 4,116,380 | 9/1978 | Donkervoort | 236/91 R |

*Primary Examiner*—William E. Wayner
*Attorney, Agent, or Firm*—Julius Rubinstein

[57] ABSTRACT

An analog computing circuit which controls a boiler or other heating system in a building, has a timer actuated setback which reduces the temperature of the building at night in such a way that as the ambient temperature approaches the lowest temperature in the temperature range for which the heating system is designed, the magnitude of the temperature drop in the building approaches zero. The analog computing circuit includes a timer actuated boost which is timed to start at a fixed time each morning. The boost causes the heating system to supply heat to the building, after the temperature in the building has been reduced the previous night, at a rate sufficient to raise the temperature of the building to its design level by a predetermined time in the morning.

20 Claims, 4 Drawing Figures

HEAT CONTROL

This invention relates to a heat control for a multi-unit building, and more particularly to a heat control which operates in such a way that the difference between the daytime building temperature and the nighttime building temperature is modulated by the ambient temperature.

BACKGROUND

Heat controls for apartment buildings or offices are designed to maintain the interior of the building at a fixed or design temperature, e.g. 72° F. during daytime throughout the ambient temperature range for which the heating system is designed. It is apparent that as the ambient temperature increases, the amount of heat required from the heating system of the building will decrease. Finally, above some ambient temperature, e.g. 70° F., the heat generated by people inside the building, the heat radiated by the sun, including the greenhouse effect, and the heat produced by gas and electrical appliances operating in the building will be sufficient to maintain the interior of the building, at least at its design temperature, without any help from the heating system.

For purposes of illustration only, the diagrams and the drawings discussed herein assume the building is heated by hot water from a boiler. It is understood, however, that the principles of this invention are applicable to any kind of heating system where the heating medium, instead of hot water from a boiler, could be hot air in an air duct, electrical currents supplied to heating elements or heat supplied by something else. In this respect, it is understood that the temperature limits and temperature ranges which are described for convenience in connection with a hot water heated building, vary when the heating system uses a different medium.

The relationship between the ambient temperature and the heat required to maintain the building at its design temperature can be seen by referring to curve R in FIG. 1 of the drawing. Curve R, commonly known as the Reset Curve, expresses the relationship between the ambient temperature and the heat output from the heating system that is necessary to maintain a particular building at its design temperature during daytime. The slope of this curve is a function of the rate of heat loss for the building for which the heating system is designed and the views of the owner of the building about a proper design temperature.

Curve R shows that at some ambient temperature, such as 30° F., the heating system must heat the boiler water to a temperature of 120° F. in order to maintain the temperature of the interior of the building at its design level, e.g. 72° F. Thus, it can be seen that throughout the design range of the heating system, the temperature of the ambient air dictates the boiler water temperature, in the case of a hot water heated building, or the temperature of a heating medium, such as air in an air duct, that is necessary to maintain the interior of the building at its design temperature, e.g. 72° F. during the day. Consequently, the heat control for the building must operate the boiler in such a way that it senses the ambient temperature, and uses that signal in accordance with curve R to provide the correct boiler water temperature.

The geographical location of the building controls the design parameters of the heating system. In the diagram shown in FIG. 1, the lowest temperature for which the heating system is designed is −40° F., which historical experience indicates to be about the lowest temperature likely to be encountered at that region. In the case of a hot water heated building, this requires a boiler water temperature of 225° F.

Heat controls for apartment buildings or offices are designed to reduce or setback the temperature of the building at night for reasons of economy. To do this, prior heat controls caused the heating system to follow the S curve which reduced the temperature of the boiler water a fixed amount during night setback over the ambient temperature range for which the heating system was designed in comparison to the boiler water temperature at the same ambient temperature during daytime when the heat control follows the R curve. Consequently, as shown in FIG. 1, the S curve was parallel to the R curve.

Experience has shown that there is no particular energy advantage in setting back the temperature of the building at night more than 10 degrees, because the period between the initiation of the set-back time at night, and the time the building must be restored to its design temperature early the next morning, is limited. If the temperature of the building is set too low, an efficiently designed heating system would be unable to restore the building to its design temperature by the proper time the next morning. Moreover, if the temperature of the building is set back too far, then at low ambient temperatures the pipes within the building could freeze or break. Furthermore, as the ambient temperature approaches the lowest temperature in the ambient temperature range for which the heating system was designed, the actual energy savings achieved by reducing the temperature of the building at night may be completely offset by the increased energy required from the heating system to restore the building to its design temperature by a predetermined time in the morning.

After the temperature of the building was reduced during the night, it had to be raised back to its design level, e.g. 72° F. by a predetermine time in the morning, e.g. 6:30 a.m. To do this in a reasonably short time, the heating system was activated so the temperature of the boiler water was held at a level higher than the temperature required by curve R at the same ambient temperature until the building temperature was restored. This increase in the level of the heat provided by the heating system is known as the morning boost.

Heating control systems during boost, follow curve B after boost is initiated. Curve B is chosen so the design temperature of the building can be restored by nearly a fixed time in the morning, e.g. 6:30 a.m., after the temperature in the building was set back the night before. Heretofore, as shown in FIG. 1, the boost curve B was parallel to the R and S curves. The difficulty with this relationship is that at lower ambient temperatures, the heating system cannot follow the boost curve B shown in FIG. 1 because its heating capacity would be exceeded. For example, as shown in FIG. 1, in order to follow curve B, when the ambient temperature was −40° F., the heating system would be required to raise the boiler water temperature to 250° F., but this exceeds the capacity of the heating system.

Another difficulty with prior heat controls is because the boost available is limited by the capacity of the heating system, the boost time had to be increased as the ambient temperature decreased. As a result the boost could not always be initiated at the same time each morning to restore the building to its design temperature. This required the initiation time for turning the morning boost to be a function of the ambient temperature which required a more costly and complicated electrical control circuit.

Yet another difficulty with prior heating systems which reduced the boiler water temperature a fixed amount each night during setback is that the actual decrease in building temperature is a function of the ambient temperature so that at lower ambient temperature the same decrease in boiler water temperature that might be satisfactory at higher ambient temperatures could reduce the building temperature to uncomfortable or even dangerous levels at lower ambient temperatures. As a result, prior heating systems, during setback, could not reduce the temperature of the boiler water as much as would otherwise have been possible were it not for the fall off in building temperature at lower ambient temperatures. Consequently, the prior heating systems were not energy efficient.

These problems and considerations suggest that the magnitude of the reduction in the temperature of the building at night from its daytime design level, i.e. 72° F. should become smaller as the ambient temperature decreases. To do this, the improved heat control is designed so the setback curve S, instead of being parallel to the curve R, as was the prior practice, is rotated around the point $T_{fw}$ on curve R, which corresponds to the lowest ambient temperature for which the heating system is designed, see FIG. 2. With this arrangement, as the ambient temperature approaches the lower limit $T_{fw}$ for which the heating system was designed, the difference between the boiler water temperature required by curve R and the boiler water temperature required by curve S would approach zero. This means that at very low ambient temperatures, the building temperature would be reduced only slightly if at all at night.

For reasons to become apparent below, the boost curve B shown in FIG. 2, is also rotated around the point $T_{fw}$, and in the particular embodiment shown is angularly spaced from curve R but in the opposite direction to Curve S. Consequently, when the heat control causes the heating system to follow the setback curve S shown in FIG. 2, the heat required from the heating system during boost can never exceed the capacity of the heating system, regardless of the ambient temperature, see FIG. 2. This is because over the ambient temperature range for which the heating system is designed, all points on curve B are entirely below the boiler water temperature, e.g. 225° F., at the upper limit of the heating system. In addition, the slope of curve B in FIG. 2, is determined by the requirement that the design temperature of the building be restored by nearly a fixed time in the morning, after the temperature of the building was set back the night before.

By way of illustration, if the ambient temperature is 30° F. during the day, the boiler water temperature would be 120° F., see FIG. 2. At night the controls of the heating system would cause the boiler to operate so the temperature of the hot water follows the setback curve S so that the temperature of the hot water or other fluid would initially drop, for example, to 90° F. Then as the ambient temperature changed, the heating system would heat the hot water or other fluid in accordance with the constraints imposed by the set-back curve S.

If the ambient temperature remained constant during the night, then at a predetermined fixed time in the morning, the heating controls would cause the heating system to follow the boost curve B and so the temperature of the hot water would be increased to 150° F. in the particular example shown.

Curve R shown in FIG. 2 can be expressed mathematically as follows:

$$t_w = (T_{ia} - t_a) \times R_r + T_{iw}. \qquad \text{Eq. 1}$$

where $t_w$ is the calculated temperature of the water in the boiler or the temperature of a heating fluid such as air in an air duct controlled by the heating system, $T_{ia}$ is the is the upper temperature in the ambient temperature range for which the heating system was designed, in this case 70° F., $t_a$ is the actual ambient temperature, $R_r$ is the slope of curve R, and $T_{iw}$ is the temperature of the hot water, or other heating medium, when the ambient temperature is $T_{ia}$.

As stated above, the heating system is designed so that for any ambient temperature in the design range of the heating system, the heating system heats the boiler water or other heating medium to a temperature sufficient to keep the building at its predetermined temperature, e.g. 72° F. during the day. At a predetermined time at night, a timer in the heat control causes the heating system to reduce the temperature of the boiler water in accordance with curve S.

Curve S can be expressed mathematically as follows:

$$t_w = (T_{ia} - t_a) \times R_r + T_{iw} - K \times (t_a - T_{ma}): \qquad \text{Eq. 2}$$

Where: $T_{ma}$ is the lowest ambient temperature the heating system is designed for, in this case, $-40°$ F., K represents a factor which controls the amount of setback and varies from 0.4545 to zero in a situation when no temperature setback is desired. The value 0.4545 is derived from practical considerations which limit the maximum change in the boiler temperature at setback to 50° F. when the outside temperature is 70° F. The ambient temperature range of from $-40°$ F. to 70° F. for which the heating system is designed as shown in FIG. 2 is a temperature difference of 110° F. Consequently, the constant K would be equal to the ratio of 50° to 110° or 0.4545.

As stated above, the boost curve B is also rotated or angularly spaced from day curve R, but in a direction opposite to curve S. For this reason, the boost curve can be expressed mathematically as follows:

$$t_w = (T_{ia} - t_a) \times R_r + T_{iw} + K \times (t_a - T_{ma}). \qquad \text{Eq. 3}$$

If the boost effect is doubled, its mathematical expression would be as follows:

$$t_w = (T_{ia} - t_a) \times R_r + T_{iw} + 2 \times K \times (t_a - T_{ma}). \qquad \text{Eq. 4}$$

What is needed, therefore, and comprises an important object of this invention, is to provide a computing circuit which can be used to control the temperature of the hot water, or other heating medium in accordance with the requirements set forth in equations 1 to 4.

A further object of this invention is to provide a computing circuit which has setback controls which function in such a way that the magnitude of the difference between the temperature in the building during daytime and the temperature in the building at night at the same ambient temperature is a function of the ambient temperature.

Another object of this invention is to provide a computing circuit which has a setback control which is designed so the magnitude of the temperature setback in the building approaches zero as the ambient temperature approaches the lowest ambient temperature for which the heating system was designed.

Yet a further object of this invention is to provide a setback/boost heat control circuit in a computing circuit wherein the boost required is a function of the ambient temperature and never exceeds the capacity of the heating system.

Still another object of this invention is to provide a setback/boost heat control whereby morning recovery to design temperature can be achieved independent of ambient temperature, while initiating the boost period at a fixed time each morning.

Still a further object of this invention is to provide a heat control in a computing circuit wherein the heat control at night has means for causing the hot water or other heating medium used to heat the building to follow setback curve S which is rotated around a point on curve R corresponding to the lowest temperature in the ambient temperature range for which the heating system was designed and the heat control has other means operating early in the morning for causing the hot water or other heating medium to follow a boost curve B which is rotated around the same point on curve R but in the opposite angular direction.

These and other objects of this invention will become more apparent when better understood in light of the accompanying specification and drawings wherein.

Figure 2:
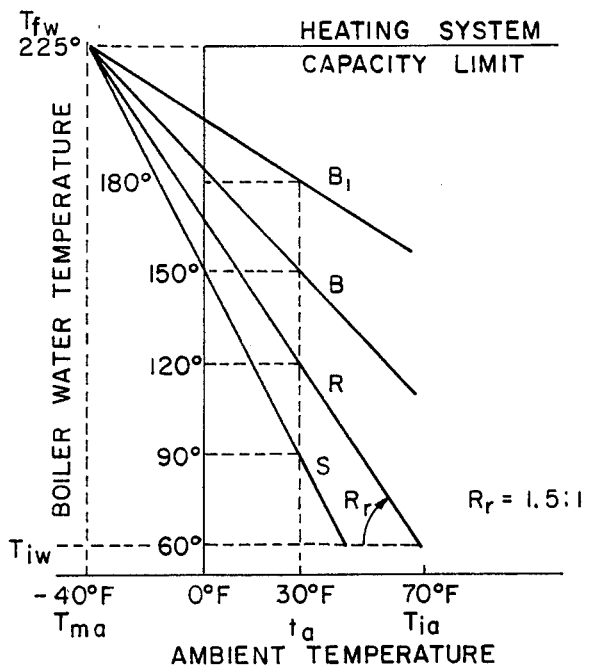
FIG. 2 is a diagram showing how a computing circuit herein causes the heating system to control the temperature of the heating medium in accordance with either the daytime curve R, the night setback curve S, or the morning boost curve B.
Figure 3:
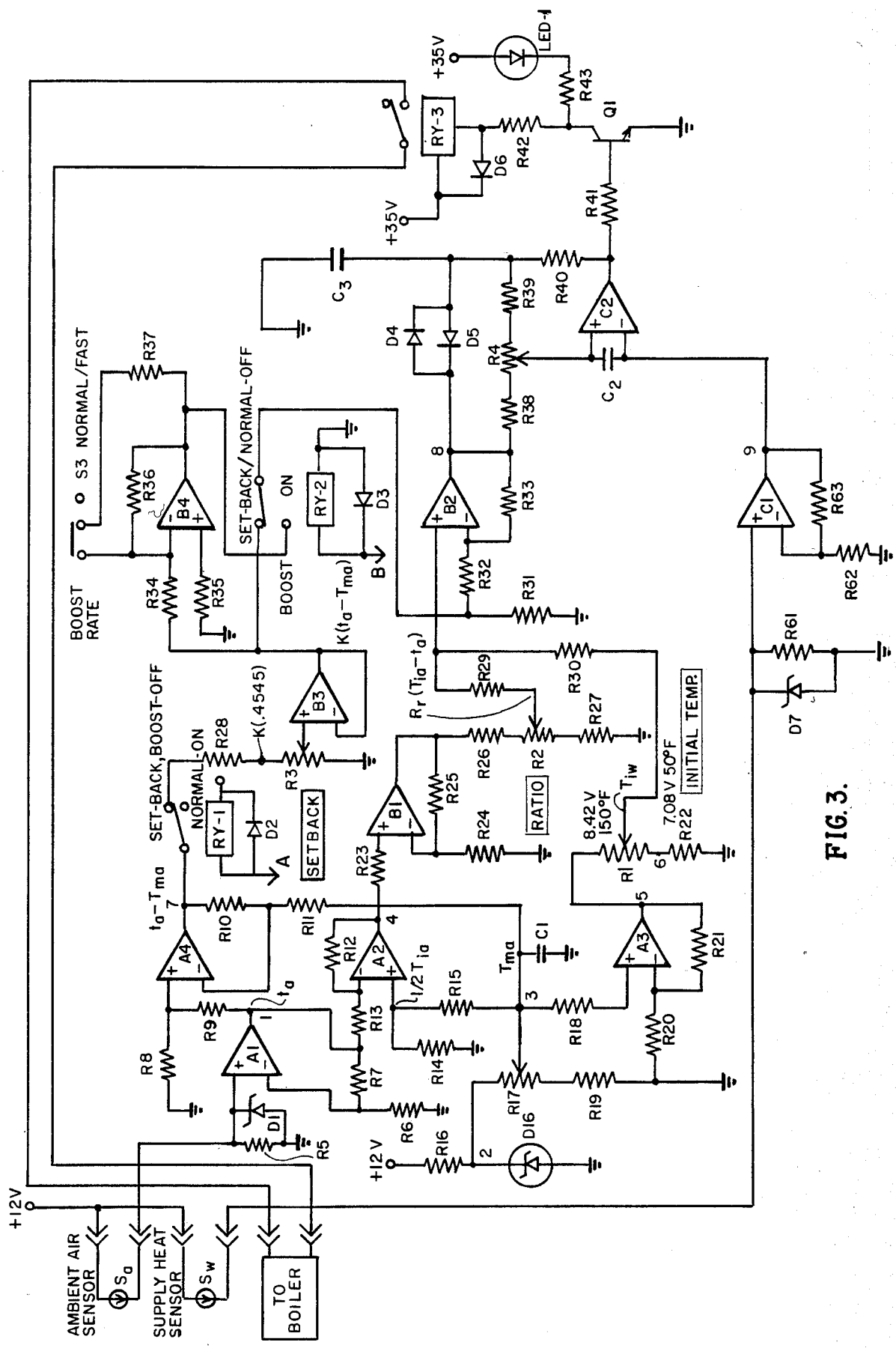
FIG. 3 is an analog computing circuit which causes the heating system to selectively follow the curves R, S or B shown in FIG. 2.
Figure 4:
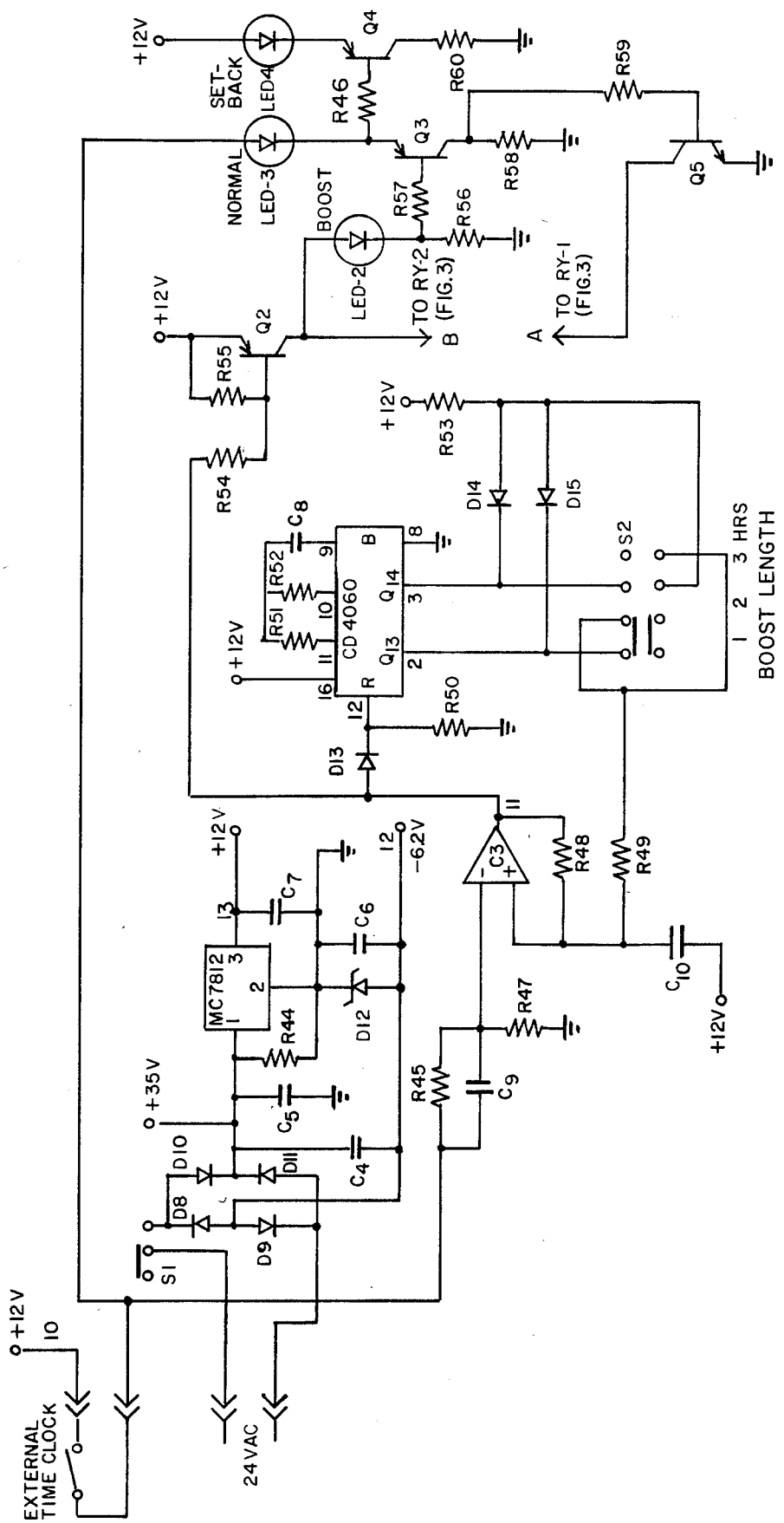
FIG. 4 is the power supply and boost timing circuit which supplies power to the analog computing circuit, and which regulates the time the control system causes the heating system to follow curves R, S or B.

Referring now to FIGS. 3 and 4 of the drawings, the analog computing circuit shown must produce voltages which are proportional to the various components of equations 1 through 4 in order for the temperature of the hot water or other heating medium to be determined by the ambient temperature in accordance with curves R, S and B shown in FIG. 2. Since the ambient temperature $t_a$ appears in all the above equations, an outside or ambient temperature sensor $s_a$, such as that made by Analog Devices Company #AD590J, is required. This sensor senses the ambient temperature outside the building and produces a small voltage which is proportional to the outside temperature. This voltage feeds into amplifier A1. The 16.6K and 24.9K resistors R6 and R7 are selected so the amplifier A1 multiplies the input voltage from sensor $s_a$ by a factor of 2.5 to raise it to a more useful level. Amplifier A1 is, as are all the amplifiers used in this circuit, a quad operational amplifier #LM324N, such as those produced by Motorola, National Semiconductor, or RCA, and is well known in the art.

To protect the input of amplifier A1 against transients, a zener diode D1, such as a Motorola 1N5249 is connected in parallel with a 10K resistor R5. The resistor R5 converts the 1 micro amp per degree Kelvin output of the sensor $s_a$ to 10 millivolts per degree Kelvin and, as shown, R5 is connected to the positive terminal of amplifier A1. The voltage output of amplifier A1 at terminal 1 is proportional to the temperature $t_a$ which forms part of equation 1.

$T_{ma}$, which appears in these equations, is the lowest ambient or outside air temperature the heating system is designed for. This temperature is based on historical experience and depends on the geographical location of the building. In the example shown in FIG. 2, the lowest temperature $T_{ma}$ likely to be encountered is $-40°$ F., and the heating system must be able to warm the interior of the building to its design level, e.g. 72° F., even when the ambient temperature is down to that level.

In order to obtain a voltage proportional to $-40°$ F., current from a 12 volt source is fed through the 1.5K resistor R16 and a zener diode LM329DZ, such as those made by National Semiconductor. The zener diode maintains the voltage at terminal 2 at 6.9 volts. This voltage is fed through the 1K variable resistor R17 and the grounded 4.7K resistor R19. The wiper of R17 is connected to ground through a 0.1 uf capacitor C1 to filter noise from the circuit. By adjusting the wiper of R17, the voltage $T_{ma}$ on terminal 3 can be adjusted to 5.825 volts, which is the voltage equivalent of $-40°$ F.

This can be shown because the signal from sensor $s_a$ is 10 millivolts per degree Kelvin across the 10K resistor R5. This voltage is multiplied by 2.5, the gain of amplifier A1, to provide 25 millivolts/degree Kelvin at terminal 1. In order for all the voltages in the circuit to be based on the same scale as sensor $s_a$, the temperature $-40°$ F. is changed to its Kelvin equivalent which is 233° K. This is multiplied by 25 millivolts per degree Kelvin resulting in 5.825 volts.

Amplifier A2 is required to provide a voltage proportional to $(T_{ia}-t_a)$, one of the components of equations 1 through 4 within. To obtain this voltage, amplifier A2 is used as a differential amplifier. The voltage proportional to $t_a$ at terminal 1 is fed into the negative input of amplifier A2 through the 200K resistor R13. The 200K resistor R12 and R13 are equal so the output of amplifier A2 at terminal 4 is twice the input voltage at the positive terminal.

As stated above, $T_{ia}$ is the upper ambient air temperature of the temperature range for which the heating system was designed. Industry has arbitrarily selected this to be 70° F. which is the same as 294° K. As explained above, this value is multiplied by 25 millivolts per degree Kelvin to obtain 7.35 volts as the voltage equivalent of 70° F. But because the output of differential amplifier A2 is twice the voltage at its positive input, the 274K and the 158K resistors R14 and R15 are selected to drop the 5.825 volts at terminal 3 to one half of 7.35 volts, or 3.675 volts at the positive input of amplifier A2. Consequently, the output of the differential amplifier A2 at terminal 4 is $(T_{ia}-t_a)$, another component of the equation 1.

Figure 1:
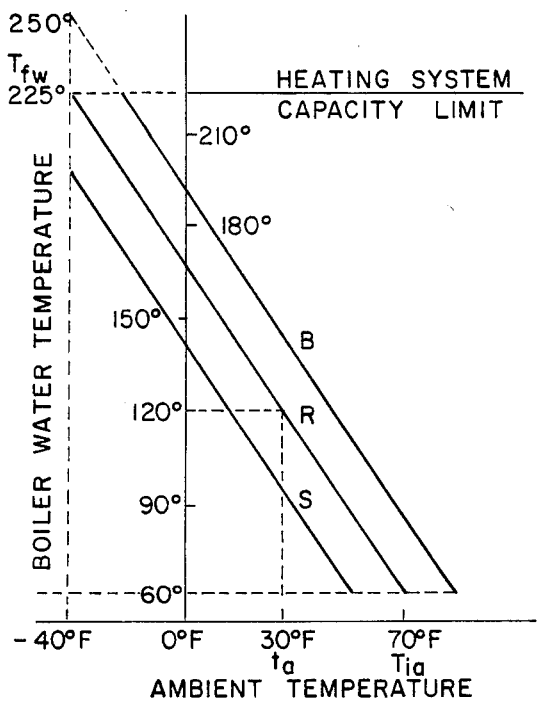
FIG. 1 is a diagram illustrating the reset curves, the setback curves and the boost curves which prior heating systems followed.

In the geographical area selected by way of example in the diagrams of FIGS. 1 and 2, the heat control system must provide warmth to the building at its design level down to an ambient temperature of $-40°$ F. This means the control system illustrated in the diagrams must regulate the temperature of the hot water, in the case of a hot water heated building, from 60° F. to 225° F., corresponding to an ambient temperature range of from −40° F. to +70° F., see curve R in FIG. 2.

Referring to equation 1, it can be seen that when the ambient temperature $t_a$ approaches the upper ambient temperature limit $T_{ia}$, then $t_w$ (the actual hot water temperature) approaches $T_{iw}$, the temperature of the hot water when the ambient temperature is 70° F. At that time the operator of the heating system adjusts the voltage analog of $T_{iw}$ in accordance with the design requirements of the building, and his own needs. Consequently, the voltage analog of $T_{iw}$ in the circuit is adjustable. In order to permit the analog computing circuit described herein to be used in a wide variety of heating systems, the circuit is designed to accommodate analog values of $T_{iw}$ in the range of from 50° F. to 150° F., which covers all values of $T_{iw}$ likely to be needed. The voltage analogs of 150° F. and 50° F. is 8.42 volts and 7.08 volts respectively, based on calculations like those described above.

To provide an adjustment for $T_{iw}$ in the range of 50° F. to 150° F., the 5.825 volts at terminal 3 is fed through the 15K resistor R18 into the positive terminal of amplifier A3. The 49.9K and 22.6K resistors R20 and R21 are selected so the output of amplifier A3 at terminal 5 is 8.42 volts which corresponds to 150° F. The voltage at terminal 5 is connected to the variable 1K resistor R1. The 5.1K resistor R22 is selected so the wiper of R1 at terminal 6 is 7.08 volts corresponding to 50° F. With this arrangement, the intermediate positions of the wiper of R1 provides all the voltages required in the range of 50° F. to 150° F.

$R_r$ the slope of curve R shown in FIG. 2, and another component of equations 1 through 4 is determined as follows: Amplifier B1 is set up with a gain of 5 as determined by the 10K, 12.5K and 49.5K resistors R23, R24 and R25. The 1.25K resistor R26 and the 1K variable resistor R2 and the 250 ohm resistor R27 are selected so that the wiper of R2 produces a voltage in the range of 0.5 to 2.5 times the voltage equivalent of $(T_{ia}-t_a)$ at terminal 4. Experience has shown that the likely values of $R_r$ lie in this range. The wiper of R2 is adjusted by the user to get the desired value of $R_r$ which meets the needs of the building, e.g. the temperature of the hot water required, according to curve R, to maintain the temperature inside the building at its design level (e.g. 72°) while the outside temperature varies from 70° F. to −40° F.

All the remaining equations described above, have the component $(t_a-T_{ma})$ where $T_{ma}$ as described above is the lowest ambient temperature for which the heating system is designed, e.g. −40° F. corresponding to 5.825 volts at terminal 3, see FIG. 2. The voltage analog of the ambient temperature $t_a$ at the output of amplifier A1 is connected to the positive input of the differential amplifier A4 through the 200K resistor R9 to develop a temperature dependent setback voltage. The voltage analog of $T_{ma}$ from terminal 3 is connected to the negative input of the differential amplifier A4 through the 200K resistor R11. The 200K resistors R8 and R10 are selected so the output of amplifier A4 at terminal 7 is the voltage analog of $(t_a-T_{ma})$. This output is connected through relay switch RY-1 to the 1.2K resistor R28 and the 1K variable resistor R3, and finally to the positive input of amplifier B3 through the wiper of R3 when RY-1 is off in the setback/boost mode.

Referring again to the remaining equations, the mathematical expression $(t_a-T_{ma})$ is multiplied by the constant K to determine the amount of setback. To do this, the resistors R3 and R28 are selected so the wiper of R3 at its maximum point is a voltage proportional to 0.4545 times $(t_a-t_{ma})$ which corresponds to the maximum hot water temperature setback of 50° F. at an ambient temperature of 70° F. It is noted that as the ambient termperature decreases, $t_a$ approaches the value of $T_{ma}$. This means that the actual setback or decrease in the building temperature at night becomes smaller, and approaches zero as the ambient temperature approaches −40° F. regardless of the position of the wiper $R_3$. It is evident that the variable resistor R3 provides a convenient way for the operator of the heating system to control the extent of the reduction in the temperature of the hot water during setback. Consequently, the voltage on the wiper of resistor R3 is the analog of $K \times (t_a-T_{ma})$. This voltage is fed into the positive terminal of buffer amplifier B3 which has a gain of one.

The output voltage from amplifier B3 is connected through relay RY-2 and a 200K resistor R32 to the negative input of the summing amplifier B2 when relay RY-2 is off in the setback/normal mode. As stated above and as shown in the drawing, the voltage proportional to $R_r \times (T_{ia}-t_a)$ at the wiper of the 1K variable resistor R2 is connected to the positive input of amplifier B2 through the 200K resistor R29, and the voltage equivalent of $T_{iw}$ on the wiper of R1 is connected to the positive input of the amplifier B2 through the 200K resistor R30. The ratio of the 200K resistor R33 to R32 is 1. This causes the output of the summing amplifier B2 to have a gain of 1 so that the output of amplifier B2 at terminal 8 is the sum of the input voltages which will be the analog of the expressions $R_r \times (T_{ia}-t_a)+T_{iw}-K \times (t_a-T_{ma})$, which is the voltage analog of the temperature of the hot water in the system as computed by the circuit in the setback mode according to equation 2.

The actual control of the boiler or heating system takes place as follows: Sensor $s_w$ shown in the drawing produces a voltage proportional, in the case of a hot water system, to the actual boiler water temperature. This voltage is connected to the positive terminal of amplifier C1. The zener diode D7 and the 10K resistor R61 perform the same function as the zener diode D1 and resistor R5 which are connected to amplifier A1. Amplifier C1 and the 16.6K and the 24.9K resistors R62 and R63 are selected to provide 2.5 times the amplification of the voltage produced by sensor $s_w$ so the voltage on terminal 9 at the output of amplifier C1 which will be raised to a more useful level. This voltage which is proportional to the actual hot water temperature is fed into the negative terminal of the comparator amplifier C2 for comparison with the circuit derived value of the boiler water temperature $t_w$ at the positive terminal of C2. As will be explained below, relay RY-3 which controls the boiler or the heat producing device of some other heating system, is itself controlled by the output of the comparator C2.

It is desirable for the relay RY-3 to operate only when there is a predetermined voltage difference between the inputs to the comparator C2 so that when the relay RY-3 causes the boiler to turn on, the boiler stays on long enough to uniformly heat the circulating water, otherwise the building would not be heated uniformly.

To do this, a hysteresis control circuit is necessary. The hysteresis circuit provides a positive and negative offset voltage, as required, to the circuit derived analog of $t_w$ at the positive terminal of amplifier C2. With this arrangement, the voltage equivalent of $t_w$ can be adjusted by the wiper of the 10K variable resistor R4 which is connected to the positive side of the comparator C2, to provide the desired offset voltages. The 1K and 11K resistors R38 and R39 and the 1N4148 Motorola diodes D4 and D5 along with the 22K resistor R40 produce voltages proportional to a differential temperature range of 2.5° F. to 25° F., symmetrical about the voltage at the output of amplifier B2 at terminal 8. The 0.1 uf capacitor $C_3$ and the 0.01 uf capacitor $C_2$ filter power line surges which could otherwise cause the comparator C2 to change state at the wrong time.

With this arrangement, the operator can control the temperature rise or fall in the boiler water temperature from 1.25° F. to 12.5° F. (½ of the differential temperature range described above) above or below the calculated temperature of the hot water $t_w$, before the heating system turns on or off. The output of comparator C2 drives the NPN transistor Q1 through the 10K resistor R41. These turn on both the boiler control relay RY-3 through the 200 ohm current limiting resistor R42, and the heat indicator light LED-1, known as the call light, through the 4.7K current limiting resistor R43. The 1N4004 diode D6, such as made by Motorola and diode D3 act to protect the circuit from induced voltages when RY-3 and RY-2 turn off. It is noted that RY-1 and RY-2 are standard 12 Vdc SPDT relays, while RY-3 is a standard 24 Vdc SPST relay.

When the hot water temperature measured by the sensor $s_w$ falls below the predetermined value set by the wiper of the variable resistor R4, the relay RY-3 closes and light LED-1 turns on indicating the boiler is supplying heat to the building. When the hot water temperature $s_w$ rises above the predetermined value set by the wiper of the variable resistor R4, relay RY-3 opens, turning off the boiler light LED-4.

The sequencing of relays RY-1 and RY-2 are both controlled by an external timer, not shown, and an internal timer such as a conventional RCA binary counter type CD4060B. At a predetermined time at night, the opening of external timer contacts removes current flowing to light LED-3, PNP transistor Q3, resistor R59, PNP transistor Q5, and terminal A, turning off relay RY-1. This introduces the setback voltage $K \times (t_a - T_{ma})$ into the computing circuit. Toward morning, at a predetermined time, the closure of the external timer on relay RY-2 through PNP transistor Q2. This disconnects the setback voltage across the 1K resistor R31, which is proportional to $K \times (t_a - T_{ma})$ while the boost voltage B2 is substituted in its place as will be described below.

When the internal timer CD4060 times out, relay RY-2 turns off while relay RY-1 remains on. When this happens, the voltage at the output of amplifier B2 is the circuit derived analog of the water temperature $t_w$, as determined by equation 1 in the normal or day mode operation.

When the relay switch RY-2 is on, at the boost terminal, the temperature-dependent setback voltage at the output of amplifier B3 is passed through the inverting amplifier B4, which is set to have a gain of minus one. This arrangement causes the output of amplifier B4 which is equal but opposite in sign to the setback voltage at the output of amplifier B3 to appear at the negative input to amplifier B2. Consequently, the boost curve B shown in FIG. 2 is rotated or angularly spaced in a direction with respect to day curve R which is opposite to the angular spacing of the setback curve S, see FIG. 2.

When the heating system follows boost curve B, as determined by inverting the output of amplifier B4, the actual boost may not be adequate to restore the temperature of the building to its design temperature by a predetermined time in the morning. Under these circumstances, the rotation of the boost curve must be varied until the final boost curve is adequate so the heating system following this final boost curve can restore the building temperature to its design level by a predetermined time in the morning over the ambient temperature range for which the heating system was designed.

To vary the rotation of the boost curve, we can cause amplifier B4 to change from having a gain of minus 1 which is determined by the ratio of the parallel 200K resistors R36 and R37 and the 100K resistor R34, to a gain of minus 2 by opening the boost rate switch S-3. In this way the gain of amplifier B4 is the ratio of R36 and R34 only. The 150K resistor R35 provides the ground reference for the inverting amplifier B4. If this is done, the heating system will cause the boiler water to be heated as determined by curve B1 shown in FIG. 2. By a judicious selection of the value of resistors R36, R37 and R34, the boost curve can be rotated any amount so that the component of equation 4, e.g. $(t_a - T_{ma})$ can be multiplied by any factor to achieve the boost required.

As earlier described, the external time clock introduces the setback mode at night, and initiates boost at a fixed time very early in the morning. When the external time clock initiates the morning boost, the 12 volts on terminal 10, see FIG. 4, causes a short positive pulse from the 0.01 uf capacitor C9, before it fully charges, to appear at the negative input of amplifier C3 which functions as a latch. This causes the output of latch C3 to go low at terminal 11. Moreover, the 68K feedback resistor R48 overcomes the negative bias of the 470K and 10K resistors R45 and R47, causing the output of amplifier C3 at terminal 11, once triggered, to remain low. The 1N4148 Motorola diode D13 is now reverse biased so no current flows through the 10K resistor R50. This removes the inhibit voltage on the reset terminal R of the internal timer or binary counter CD4060B. When this happens, the 0.1 uf capacitor C8 along with the 8.2M and the 4.1M resistors, R51 and R52 causes the counter to start counting or timing. In the meantime, current from terminal 11 at the output of C3 passing through the 10K resistor R54 will overcome the affect of the 2.7K pull-up resistor R55, turning the PNP transistor Q2 on. When Q2 turns on it turns the boost light indicator LED-2 on.

When this happens, the current through LED-2 returns to ground through the 1.5K resistor R56. This causes the PNP transistor Q3 to turn off because when LED-2 is on, it pulls the base of Q3 high through the 47K resistor R57. When transistor Q3 is off, no current flows through the 1.5K resistor R58 to ground and the base current through the 47K resistor R46 to the PNP transistor Q4 is removed, turning Q4 off and also removing current flow through the 1.5K resistor R60. When transistors Q3 and Q4 are off, the setback indicator light LED-4 and the day mode indicator light LED-3 are off and relay RY-1 remains off at its setback/boost terminal because there is no voltage across the 1.5K resistor R58 to ground. In addition, the NPN transistor Q5 which controls relay RY-1 is off since resistor Q5 does not receive base current from transistor Q3 through the 10K resistor R59. The day mode indicator light LED-3 remains off because transistor Q3 is off. Only LED-2, the boost indicator light remains on.

At the beginning of the day, when the timer times out after one to three hours, as determined by the position of the boost length switch S2, counting is inhibited by the conduction of the diode, D13, causing the base of transitor Q2 to go high, turning it off along with the boost light LED-2. At the same time, the transistors Q3 and Q5 turn on, causing the day mode light LED-3 to turn on, leaving the setback light LED-4 to remain off. When the timer times out, the selected outputs Q13 and Q15 of the binary counter go high. When this happens, a positive going current is fed through the 10K resistor R49 into the latch amplifier C3 which overcomes the bias at its negative terminal as determined by the 470K and 10K resistors R45 and R47. This causes terminal 11 at the output of amplifier C3 to go high turning off transistor Q2 as explained above. When transistors Q3 and Q5 turn on, they cause relay RY-2 to remain off at the setback/normal terminal while relay RY-1 turns on, at the normal terminal and the heat control system is in the day mode.

The 1N4148 Motorola diodes D14, D15 and the 100K resistor R53, and the boost length switch S2 are connected as shown to permit up to three hours of boost timing to be selected. The 0.01 uf capacitor C10 applies a positive pulse to the positive input of latch C3 when power is first applied. This resets the boost time so that the heating control will start out in the normal day mode. All the PNP and NPN transistors described above are standard 2N3906 and 2N3904 transistors such as made by Motorola. The 1N4004 diode D2 functions to protect the circuit from inducted voltages from the relay coil RY-1 as it turns off.

At night in the setback mode, when the external clock contacts open, LED-3 turns off and the setback light LED-4 and transistor Q4 turn on because transistor Q4 draws base current through the transistor emitter base junction of transistor Q3 and through the resistors R46, R56 and the 47K resistor R57. The 1.5K resistor R60 returns the current through LED-4 and Q4 to ground.

Power to the circuit is provided by 24 volts AC from an external transformer passing through the power switch S1 to the 1N4004 diodes D8, D9, D10 and D11. These are connected together to form a diode bridge. The output of this bridge is filtered by the 330 uf and 0.1 uf capacitors C4 and C5 to produce a rectified smooth DC voltage of 35 volts. This voltage is fed into a conventional voltage regulator such as MC7812 by Motorola, providing a positive 12 volt output at terminal 13. The 0.1 uf capacitors $C_6$ and $C_7$ function to decouple any RF from the power supply. The cathode of the Motorola 1N4735 zener diode D12, drawing current through the 1K resistor R44 and returning the current to the negative side of the bridge, produces a negative 6.2 volt reference at terminal 12, in the diode bridge. The positive 12 volts and the negative 6.2 volts at terminals 13 and 12 respectively are used to supply power to the circuit as shown in FIGS. 3 and 4.

Having explained the invention, what I claim as new is:

1. A heat control for a building heating system using a heating medium for maintaining the temperature of the building at a design level during daytime operation throughout the ambient temperature range for which the heating system was designed comprising a computing circuit, said circuit connected to said heating system in such a way that it establishes a functional relationship between the temperature of the heating medium and the ambient temperature wherein the temperature of the heating medium required to maintain the temperature of the building at its design level during daytime operation generally decreases as the ambient temperature increases, and setback means in said circuit for reducing the temperature in the building at night in such a way that as the ambient temperature approaches the lowest temperature in the temperature range for which the heating system is designed, the magnitude of the temperature reduction in the building also decreases.

2. A heat control for a building heating system using a heating medium to maintain the temperature of the building at a design level during daytime operation throughout the ambient temperature range for which the heating system was designed comprising a computing circuit, said circuit connected to the heating system in such a way that it establishes a functional relationship between the temperature of the heating medium and the ambient temperature wherein the temperature of the heating medium necessary to maintain the temperature of the building at its design level during daytime operation generally decreases as the ambient temperature increases over the temperature range for which the heating system was designed, and setback means in said circuit for reducing the temperature of the building at night by reducing the temperature of the heating medium in such a way that as the ambient temperature approaches the lowest temperature in the temperature range for which the heating system is designed, the temperature of the heating medium when the setback means is operating approaches the temperature of the heating medium during daytime operation at the same ambient temperature, whereby the magnitude of the reduction of the building temperature at night approaches zero as the ambient temperature approaches said lowest temperature in said temperature range.

3. A heat control for a building heating system using a heating medium to maintain the temperature of the building at its design level during daytime throughout the ambient temperature range for which the heating system was designed comprising a computing circuit, said circuit connected to the heating system in such a way that during daytime operation, the temperature of the heating medium necessary to maintain the temperature of the building at its design level over the temperature range for which the heating system is designed, is inversely proportional to the ambient temperature, setback means in said circuit for reducing the temperature of the building at night by reducing the temperature of the heating medium in such a way that as the ambient temperature approaches the lowest temperature in the temperature range for which the heating system was designed, the magnitude of the reduction of the temperature of the heating medium at night in comparison to the temperature of the heating medium during daytime operation at the same ambient temperature approaches zero whereby the magnitude of the reduction of the building temperature at night approaches zero as the ambient temperature approaches said lowest temperature.

4. A heat control for a building heating system using a heating medium to maintain the temperature of the building at its design level during daytime throughout the ambient temperature range for which the heating system was designed comprising a computing circuit, said circuit connected to said heating system in such a way that during daytime, the circuit operates in a daytime mode and regulates the temperature of the heating medium at a level necessary to maintain the temperature of the building at its daytime design level over the ambient temperature range for which the building heating system is designed, the variation between the temperature of the heating medium in the daytime mode and the ambient temperature being a first straightline curve which slopes in such a way that the temperature of the heating medium is inversely proportional to the ambient temperature over said temperature range, setback means in said circuit for reducing the temperature of the building at night by reducing the temperature of the heating medium when the circuit is operating in a setback mode, said setback means controlling the heating system in such a way that the variation between the temperature of the heating medium and the ambient temperature is a second straightline curve which slopes in such a way that said second straightline curve intersects the first straightline curve at the lowest temperature in the temperature range for which the heating system is designed, so that as the ambient temperature approaches the said lowest ambient temperature, the magnitude of the reduction of the building temperature at night approaches zero.

5. The heat cooling system described in claim 4 including boost means for causing the heating system to operate in a boost mode and to supply heat to the building at a rate greater than the heat required when the circuit operates in the daytime mode at the same ambient temperature, in order to restore the temperature of the building to its design level by a predetermined time in the morning after the temperature of the building was reduced when the circuit was in the setback mode, said boost means controlling the heating system in such a way that the variation between the temperature of the heating medium when the circuit is in the boost mode and the ambient temperature, is a third straightline curve which intersects the first and second straightline curve at the said lowest ambient temperature.

6. A heat control for a building heating system which uses a heating medium to maintain the temperature of the building at a design level during daytime throughout the ambient temperature range for which the heating system was designed, comprising a computing circuit, said circuit having at least two modes of operation including a daytime mode and a setback mode wherein the circuit in the daytime mode maintains the temperature of the building at its design level and in the setback mode the circuit reduces the temperature of the building at night by reducing the temperature of the heating medium, said circuit operating so the relationship between the temperature of the heating medium and the ambient temperature in both modes of operation are curves wherein the temperature of the heating medium generally decreases as the ambient temperature increases over the ambient temperature range for which the heating system is designed, said curves intersecting at the lowest temperature in the temperature range for which the building heating system is designed whereby the magnitude of the reduction of the building temperature at night approaches zero as the ambient temperature approaches the said lowest ambient temperature.

7. The heat control described in claim 6 wherein the circuit includes a boost mode, said circuit operating so when said circuit is in the boost mode, the circuit causes the heating system to restore the temperature of the building to its design level after the temperature of the building was reduced during the setback mode.

8. The heat control described in claim 7 including timing means for initiating the setback mode at a fixed time each evening, for initiating said boost mode at a fixed time each morning in order to restore the temperature of the building to its design level within a predetermined time after the boost mode is initiated, and for initiating the daytime mode after the circuit in the boost mode has restored the building temperature to its design level.

9. A heat control for a building heating system which uses a heating medium to maintain the temperature of the building at a design level during daytime throughout the ambient temperature range for which the heating system was designed comprising a control circuit connected to said heating system, said circuit having at least two modes of operation including a daytime mode and a setback mode, the control circuit in the daytime mode maintaining the temperature of the building at its design level, and the control circuit in the setback mode reducing the temperature of the building at night by reducing the temperature of the heating medium, said control circuit operating so in both modes of operation the relationship between the temperature of the heating medium and the ambient temperature are represented in the form of a daytime curve and a setback curve, each curve having a form such that the temperature of the heating medium generally decreases as the ambient temperature increases over the ambient temperature range for which the heating system is designed, said setback curve rotated around a point in the daytime curve corresponding to the lowest ambient temperature in the temperature range for which the heating system is designed whereby the magnitude of the reduction of the building temperature at night approaches zero as the ambient temperature approaches the said lowest ambient temperature.

10. The heat control described in claim 9 wherein the control circuit includes a boost mode, said circuit operating so when said circuit is in the boost mode, the circuit causes the heating system to restore the temperature of the building to its design level after it was reduced during the night.

11. The heat control described in claim 10, wherein the relationship between the temperature of the heating medium and the ambient temperature in the boost mode is a boost curve having a form such that the temperature of the heating medium generally decreases as the ambient temperature increases, said boost curve rotated around the same point of the daytime curve as the setback curve but in the opposite direction, and all points on said boost curve being below the maximum temperature of the heating medium when the heating system is operating at its capacity.

12. The heat control described in claim 11, including means for varying the rotation of the boost curve.

13. The heat control described in claim 11 wherein the daytime curve, the setback curve and the boost curve, are all straightline curves.

14. The heat control described in claim 10 wherein the circuit includes timing means for initiating the setback mode at a fixed time each evening to reduce the temperature of the building at night, for initiating said boost mode at a fixed time each morning to restore the temperature of the building to its design level within a predetermined time after the boost mode is initiated, and for initiating the daytime mode after the boost mode has restored the building temperature to its design level.

15. The heat control described in claim 11 wherein the circuit includes timing means for initiating the setback mode at a fixed time each evening, for initiating said boost mode at a fixed time each morning in order to restore the temperature of the building to its design level within a predetermined time after the boost mode is initiated, and for initiating the daytime mode after the boost mode has restored the building temperature to its design level.

16. A heat control for a building which uses a heating medium to maintain the temperature of the building at a design level during daytime throughout the ambient temperature range for which the heating system was designed comprising an analog computing circuit, said circuit having at least two modes of operation including a daytime mode and a setback mode, wherein the circuit in the daytime mode maintains the temperature of the building at its design level by regulating the temperature of the heating medium in accordance with the following equation:

$$t_w = (T_{ia} - t_a) \times R_r + T_{iw}$$

where $t_w$ is the temperature of the heating medium, $t_a$ is the ambient temperature, $T_{ia}$ is the upper level of the ambient temperature range for which the heating system was designed, $R_r$ is the slope of the equation, $T_{iw}$ is the temperature of the heating medium when the ambient temperature is at the upper level of the temperature range for which the heating system was designed, and wherein the circuit in the setback mode regulates the temperature of the heating medium in accordance with the following equation:

$$t_w = (T_{ia} - t_a) \times R_r + T_{iw} - K \times (t_a - T_{ma})$$

where K represents a factor which controls the magnitude of the reduction of the temperature in the heating medium and $T_{ma}$ is the lowest ambient temperature for which the heating system is designed, whereby as the ambient temperature approaches the lowest ambient temperature in the temperature range for which the heating system is designed, the magnitude of the reduction of the building temperature at night approaches zero.

17. The heat control described in claim 16 wherein the analog circuit includes a boost mode wherein the circuit in the boost mode maintains the temperature of the heating medium in accordance with the follow equation:

$$t_w = (T_{ia} - t_a) \times R_r + T_{iw} + K \times (t_a - T_{ma}).$$

18. The heat control described in claim 16 wherein the control circuit includes a boost mode and wherein the circuit has means for selectively controlling the magnitude of the boost.

19. The heat control described in claim 18 wherein the control circuit includes a boost mode wherein the circuit in the boost mode has means for selectively controlling the temperature of a heating medium in accordance with the following equation:

$$t_w = (T_{ia} - t_{ia}) \times R_r + T_{iw} + N \times K \times (t_a - T_{ma})$$

where N is any multiplying factor.

20. The heat control described in claim 17 wherein the circuit has means for varying the constants $R_r$ and $T_{iw}$ so that the computing circuit can be made compatible with a variety of heating systems.

* * * * *

UNITED STATES PATENT AND TRADEMARK OFFICE
CERTIFICATE OF CORRECTION

PATENT NO. : 4,557,417
DATED : December 10, 1985
INVENTOR(S) : Ernest D. Ruby

It is certified that error appears in the above-identified patent and that said Letters Patent are hereby corrected as shown below:

Column 2, line 41 should read ..."by a predetermined time ..."

Claim 5, line 1 should read "The heat control system described..."

Signed and Sealed this

Seventeenth Day of June 1986

[SEAL]

Attest:

DONALD J. QUIGG

Attesting Officer

Commissioner of Patents and Trademarks